Dec. 23, 1941.  D. M. MacMILLAN  2,267,243
RETREADING MOLD
Filed Dec. 2, 1939  2 Sheets-Sheet 1

D. M. MacMillan
INVENTOR.

BY *C. A. Snow & Co.*
ATTORNEYS.

Dec. 23, 1941.   D. M. MacMILLAN   2,267,243
RETREADING MOLD
Filed Dec. 2, 1939   2 Sheets-Sheet 2

D. M. MacMillan
INVENTOR.

BY C. A. Knowles
ATTORNEYS.

Patented Dec. 23, 1941

2,267,243

UNITED STATES PATENT OFFICE 2,267,243

RETREADING MOLD

Donald M. MacMillan, Macon, Ga., assignor to MacMillan Electric Mold & Rubber Company, Inc., Baldwin County, Ga., a corporation Application December 2, 1939, Serial No. 307,318

4 Claims. (Cl. 18—18)

This invention aims to provide a device for retreading tires, which is simple in construction and capable of being manufactured at small cost, compared with machines at present in use, no adjustments being required, and the construction being such that tire casings of different sizes, within reasonable limits, can be worked upon in one machine.

Another object of the invention is to supply a device of the class described, in which the heat is applied to the new stock, as distinguished from the body of the tire to which a new tread is to be applied.

A further object of the invention, specifically considered, is so to construct the cooperating pressure members that the side walls of the tire will be prevented from overheating.

The invention proposes the use of a removable, tire-retaining ring, so constructed that it can be applied easily, and be removed with equal facility.

A further object of the invention is to supply a device of the class described, embodying novel means for handling the tire casing.

In the machine forming the subject matter of this application, the size of the mold remains unchanged, the ring accomplishing the results heretofore attained, and generally attained imperfectly, by a complicated mold structure.

A further object of the invention is so to construct a device of the class described that the ring will have contact with the mold or body, the ring being adequately heated, and the heat being applied to the tire, adjacent to the tread thereof, as distinguished from being applied to the side portions of the tire.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
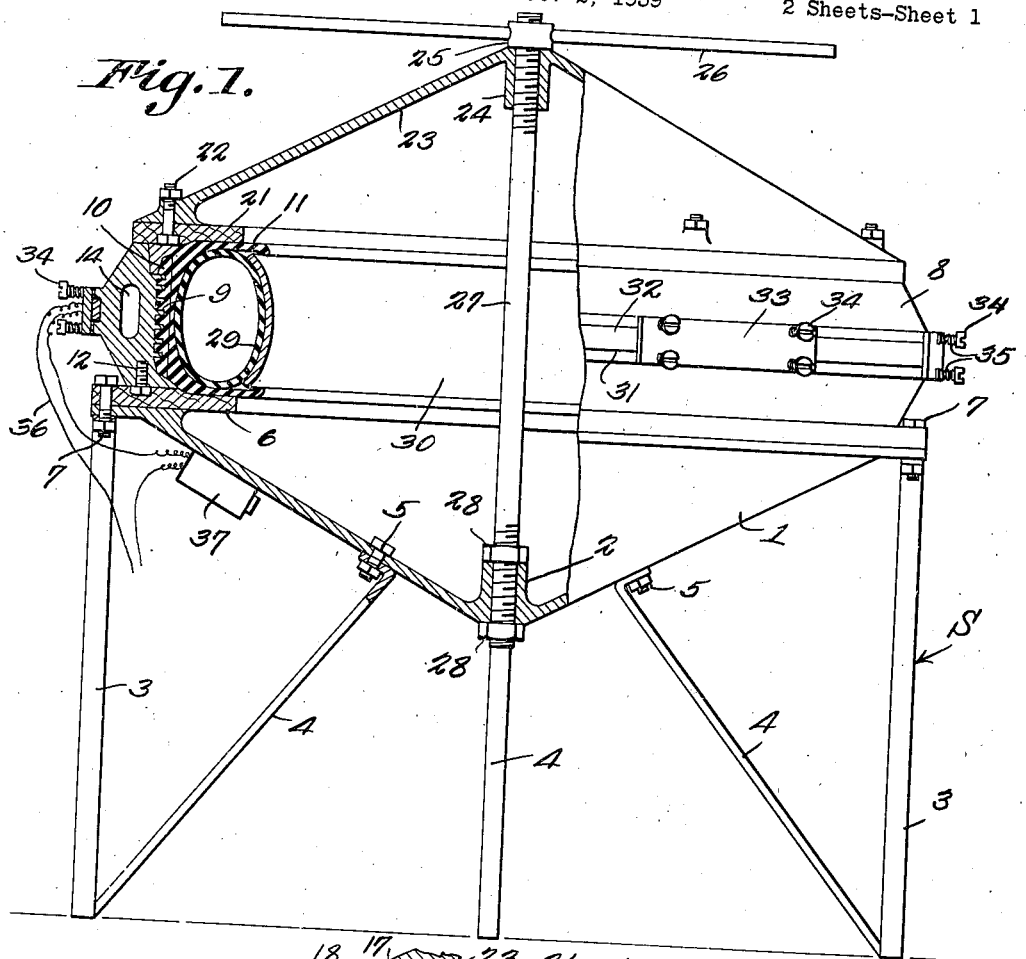
Fig. 1 shows, in side elevation, a device constructed in accordance with the invention, parts being broken away.

In carrying out the invention, there is provided a support or stand S, including an inverted conical base 1 having a central upstanding hub 2, the base being supported on legs 3. Inclined braces 4 extend between the base 1 and the legs 3, the braces being attached to the base 1 by securing elements 5. An abutment ring 6 is provided, and preferably is made of wood, to prevent the transmission of heat to the side portions of the tire. Securing elements 7 attach the abutment ring 6 to the upper flange of the base 1.

Headed studs 12, engaging the lower end of the mold 8, hold the mold in place, assembled with the abutment ring 6. The mold 8 is supplied with an annular air chamber 14. In its stop, the mold 8 has a recess, including an annular surface 15, which slants inwardly, that is, toward the geometrical center of the mold, to define an annular shoulder 16, located in a plane substantially at right angles to the central, vertical axis of the mold 1. The mold 8 has projections 9 which give the desired anti-slipping surface to the tread 10 which is to be applied to a tire 11.

Figure 3:
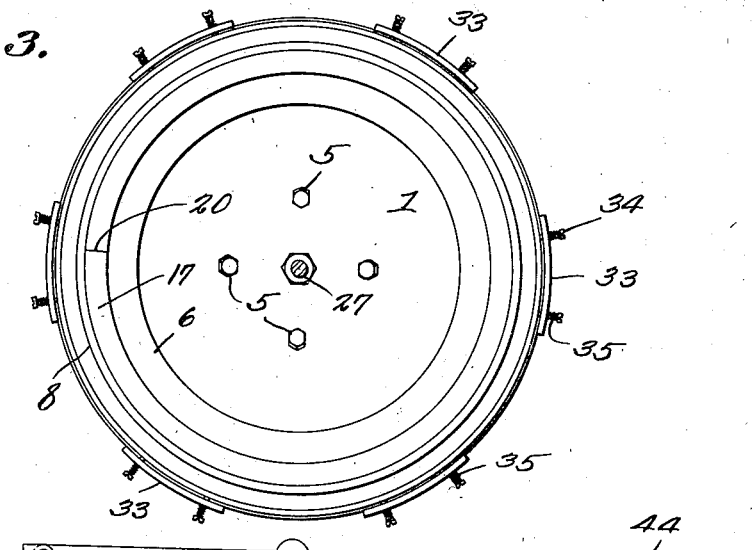
Fig. 3 is a top plan, parts being removed.

There is provided a resilient ring 17, preferably made of metal, such as aluminum, although some other material might be used. The ring 17 has an inclined outer surface 18, which is shaped to cooperate with the inclined surface 15 of the mold 8. The ring 17 is shaped as indicated at 19, to correspond with the configuration of the edge of the tread 10 and with the adjacent portion of the tire 11. The ring 17 is divided transversely, as shown at 20 in Fig. 3, to form separable ends.

Figure 2:
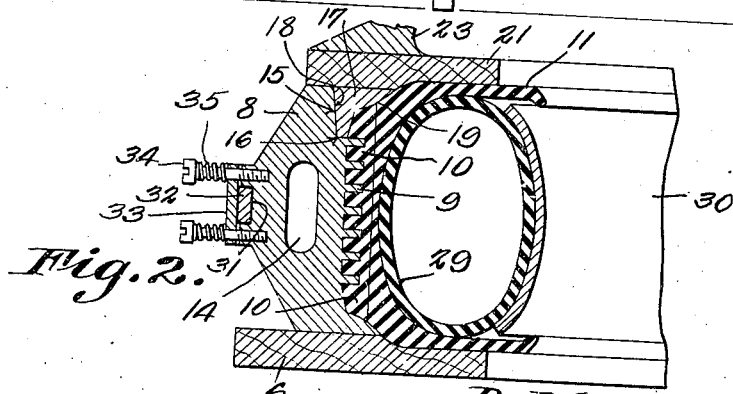
Fig. 2 is a sectional detail, showing the parts which are intimately associated with the tire.

The tire 11 to which the tread 10 is to be applied, is placed in the mold 8, as shown in Fig. 2. The ring 17, as indicated in the drawings, is mounted in the recess in the mold 8. If pressure in opposite directions is applied to the ring 17 and to the mold 8, or, more specifically, if downward pressure is exerted on the ring 17, the ring will be pressed downwardly, and because of the inclined surfaces shown at 15 and 18, on the mold 8 and on the ring 17, respectively, the ring will be contracted until its end surfaces come into abutment, and until the ring engages the shoulder 16.

Pressure is applied to the ring 17 and to the adjacent side portion of the tire 11, by means of a ring 21, disposed at the upper end of the mold 8 and secured at 22 to a conical cap 23, having a central hub 24. The ring 21 preferably is made of wood to avoid the transmission of heat to the side of the tire 11, the heat being confined to the tread 10, that is, to new stock.

Pressure is applied to the cap 23 and associated parts, by means of a nut 25 having handles 26, the nut being threaded on a spindle 27, passing through the hub 24 of the cap 23, but not threaded thereinto. Nuts 28 hold the spindle 27 fixed in the hub 2 of the base 1.

An expansible, resilient, pressure holding, curing bag 29 is placed within the tire 11 and is sustained by a foldable annular member 30.

Heat may be applied to the mold 8 in any desired way. Preferably, however, the mold 8 is supplied with an external, circumscribing groove 31 in which is received an electrical heater 32. The heater is held in place by shoes 33, slidably mounted on radial outstanding studs 34, carried by the mold 8. The studs 34 carry compression springs 35, which urge the shoes inwardly. The circuit for the heater 32 is shown at 36, and in it is interposed a thermostat 37, mounted on the base 1 or elsewhere, and by means of the thermostat, the heating may go forward to the desired extent without attention on the part of an operator.

It can be seen that, by the operation of the simple machine provided, a tire can be retreaded, almost without a chance of failure. The heat, owing to the provision of the non-conducting rings 6 and 21, will be confined to new stock, represented by the tread 10, with obviously desirable results.

After the retreading operation has been completed, the handling of the tire 11 gives rise to problems which have not been overlooked.

Figure 4:
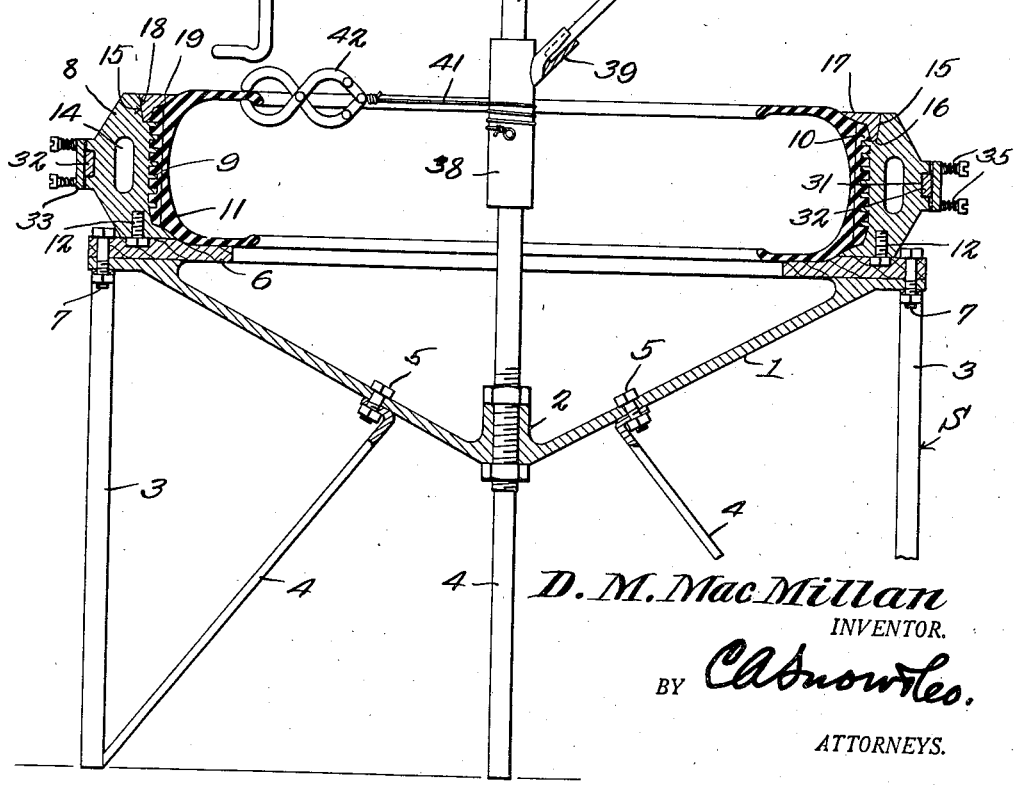
Fig. 4 is a transverse sectional view showing the instrumentalities whereby the tire is manipulated.

Referring to Fig. 4, it will be noted that after the cap 23 and associated parts have been removed, the handle-nut 25 is threaded off the upper end of the spindle 27. A drum 38 is slipped down over the spindle 27 and is journaled for rotation on the spindle. The drum 38 is provided with a laterally extended socket 39, adapted to receive an upwardly inclined handle 40. A strong flexible element 41 is secured at its inner end to the drum 38 and is wound about the drum. At its outer end, the flexible element 41 is secured to a pinch grip 42, adapted, under the pull of the flexible element 41, to engage the side wall of the tire 11. The drum 38 may be rotated by means of the handle 40, and the tire will be pulled inwardly, thus separating it from the mold 8.

In place of the nut 25, a carrier 43 is threaded on the upper end of the spindle 27. A lever 44 is fulcrumed intermediate its ends at 45, on the carrier 43. At one end, the lever 44 is provided with a lifter 46, which may be a hook, pivoted at 47 to the lever. By a proper operation of the lever 44, the lifter 46 may be made effective to hoist the tire 11 clear of the mold 8.

Having thus described the invention, what is claimed is:

1. In a device for retreading tires, an annular mold, a metal tire-engaging ring, transversely severed for expansion and contraction, and removably mounted in the mold at one end thereof, for free sliding movement in a direction parallel to the axis of the mold, the mold and the ring having plain and continuous cooperating inclined surfaces which coact to contract the ring when relative advancing movement between the ring and the mold occurs, and means external to the mold and under the control of an operator for advancing the ring, said means comprising an annular tire-engaging pressure member made of material which is a poor conductor of heat, said member being wider than the ring, to engage the side of a tire, inwardly of the ring.

2. In a device for retreading tires, an annular mold, a ring, transversely severed for expansion and contraction, and removably mounted in the mold at one end thereof, and annular tire-engaging members overlapping the ring and the ends of the mold, said members having a heat conductivity less than that of metal, the ring and the mold having interengaged and inclined surfaces which contract the ring upon relative advancing movement between the ring and the mold.

3. In a device for retreading tires, a support, an annular mold carried by the support, a spindle carried by the support, within the mold, a drum journaled on the spindle, a flexible element wound at one end about the drum, and a tire-engaging pinch grip carried by the opposite end of the flexible element.

4. In a device for retreading tires, a support, an annular mold carried by the support, a spindle carried by the support, within the mold, a drum journaled on the spindle, a flexible element wound at one end about the drum, and a tire-engaging member carried by the opposite end of the flexible element.

DONALD M. MACMILLAN.